(12) United States Patent
Pujol

(10) Patent No.: US 8,466,788 B2
(45) Date of Patent: Jun. 18, 2013

(54) DEVICE AND METHOD FOR PROTECTION AGAINST INTRUSION INTO THE LANDING GEAR HOUSING OF AIRCRAFT

(75) Inventor: Olivier Pujol, Montaigut sur Save (FR)

(73) Assignee: Airbus Operations SAS (FR)

( * ) Notice: Subject to any disclaimer, the term of this patent is extended or adjusted under 35 U.S.C. 154(b) by 581 days.

(21) Appl. No.: 12/595,685

(22) PCT Filed: Apr. 22, 2008

(86) PCT No.: PCT/FR2008/050729
§ 371 (c)(1),
(2), (4) Date: Apr. 13, 2010

(87) PCT Pub. No.: WO2008/145922
PCT Pub. Date: Dec. 4, 2008

(65) Prior Publication Data
US 2010/0201517 A1    Aug. 12, 2010

(30) Foreign Application Priority Data
Apr. 23, 2007  (FR) .................................... 07 54642

(51) Int. Cl.
*G08B 13/00* (2006.01)
(52) U.S. Cl.
USPC ..... 340/541; 340/540; 340/425.5; 340/426.1; 340/426.22

(58) Field of Classification Search
USPC .............. 340/540, 541, 425.5, 426.1, 426.22, 340/945, 962–970
See application file for complete search history.

(56) References Cited

U.S. PATENT DOCUMENTS

| 5,208,590 | A | * | 5/1993 | Pitts ............................. 340/973 |
| 2002/0120375 | A1 | * | 8/2002 | Draoullec et al. ............... 701/29 |
| 2007/0007088 | A1 | * | 1/2007 | Miller et al. ............. 188/1.11 L |
| 2008/0143832 | A1 | * | 6/2008 | Bramoulle .................... 348/144 |

FOREIGN PATENT DOCUMENTS

| EP | 1 843 176 A |   | 10/2007 |
| FR | 2 775 534 A |   | 9/1999 |
| FR | 0652114 | * | 6/2006 |
| FR | 2 893 169 A |   | 5/2007 |

* cited by examiner

*Primary Examiner* — Daniel Wu
*Assistant Examiner* — Vishak Ganesh
(74) *Attorney, Agent, or Firm* — Lerner, David, Littenberg, Krumholz & Mentlik, LLP

(57) ABSTRACT

The disclosed embodiments relate to a device for protection against intrusions into the landing gear housings of an aircraft, including at least one sensor, for at least one housing, covering at least one housing entry area and connected to a calculator capable of processing the data from the sensor for detecting the intrusion of a target and generating intrusion occurrence information for triggering an alarm, wherein the calculator is connected to a device for providing aircraft flight phases and/or ground speed information, the device including a means adapted for changing the detection status from an active mode to an inactive mode based on the flight phases and/or ground speed information.

10 Claims, 3 Drawing Sheets

Figure 1:
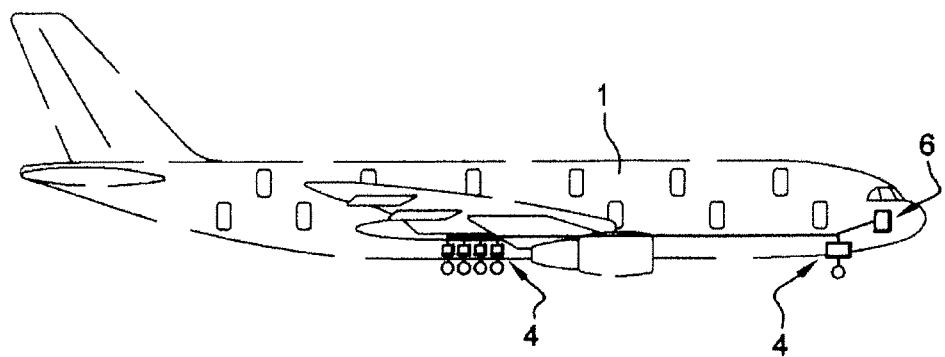

DEVICE AND METHOD FOR PROTECTION AGAINST INTRUSION INTO THE LANDING GEAR HOUSING OF AIRCRAFT

CROSS-REFERENCE TO RELATED APPLICATIONS

This application is the National Stage of International Application No. PCT/FR2008/050729 International Filing Date, 22 Apr. 2008, which designated the United States of America, and which International Application was published under PCT Article 21 (2) as WO Publication No. WO2008/145922 A1 and which claims priority from French Application No. 07 54642 filed on 23 Apr. 2007, the disclosures of which are incorporated herein by reference in their entireties.

BACKGROUND

1. Field

The disclosed embodiments relate to a device and method for alerting in the event that foreign bodies are introduced into the housings of aircraft gear.

2. Brief Description of Related Developments

It transpires that stowaway migrants risk their life by secreting themselves aboard the housings of landing gear of airliners on international journeys.

Lack of oxygen and temperatures of below −40° C., critical at altitude, make this journey in most cases extremely dangerous, or indeed fatal. Experience shows that very few stowaways have survived this type of journey.

Paradoxically, it is relatively easy to hoist oneself aboard aircraft with the aid of the kinematics of the gear housings.

This risk is heightened furthermore in airports where surveillance of the surroundings is very restricted, thereby easing the stowaway's access to the aircraft.

Airline companies generally make an inspection of the gear housings when checking over the aircraft before takeoff, but this inspection is ineffective for two reasons:
- on certain wide-bodied planes, the space reserved for the gear housing is immense and inspection is made difficult because of the numerous crannies, especially if this inspection is done at night;
- experience shows finally that most stowaways climb aboard during the takeoff phase in particular during the alignment of the aircraft before throttle-back.

Moreover a great many airliner takeoffs from countries with high emigration rates are performed at night, thereby making it still more difficult to spot would-be stowaways.

Another issue is related to the security aspect in the sense that the ease of access to the gear housings before takeoff and the difficulty of inspection can constitute a risk to flight safety.

SUMMARY

The aspects of the disclosed embodiments propose a system making it possible to protect the aircraft against potential intrusions, not only in order to save the life of persons wishing to hide away in landing gear housings, but also in order to improve aircraft security.

Accordingly the disclosed embodiments provides a device for protection against intrusions into housings of landing gear of an aircraft that comprises at least one sensor, for at least one housing, for covering at least one inlet zone of the housing, linked to a computer suitable for processing the data arising from the sensor so as to detect the intrusion of a target and for generating an intrusion presence indication suitable for triggering an alarm and for which the computer is linked to a device for providing indications of flight phases or of ground speed of the aircraft, the device comprising means suitable for changing the detection status, from an active mode to an inactive mode, as a function of said indications of flight phases or of ground speed.

The aspects of the disclosed embodiments furthermore provide a method for detecting intrusion into at least one housing of landing gear of an aircraft comprising:
- surveillance of the inlet zone of the housing with a device comprising at least one sensor linked to a detection and validation computer;
- processing of the data arising from the sensor at the level of the computer so as to isolate a signature representative of an intrusion into said housing,
- alarm triggering when an intrusion detection is detected,
- determination of surveillance activation slots and of surveillance inactivation slots as a function of data arising from at least one avionics computer emitting data representative of flight phases or of ground speed of the aircraft, and
- validation of the alarm when the data representative of flight phases or of ground speed are determined as being compatible with the surveillance activation slot.

Figure 2:
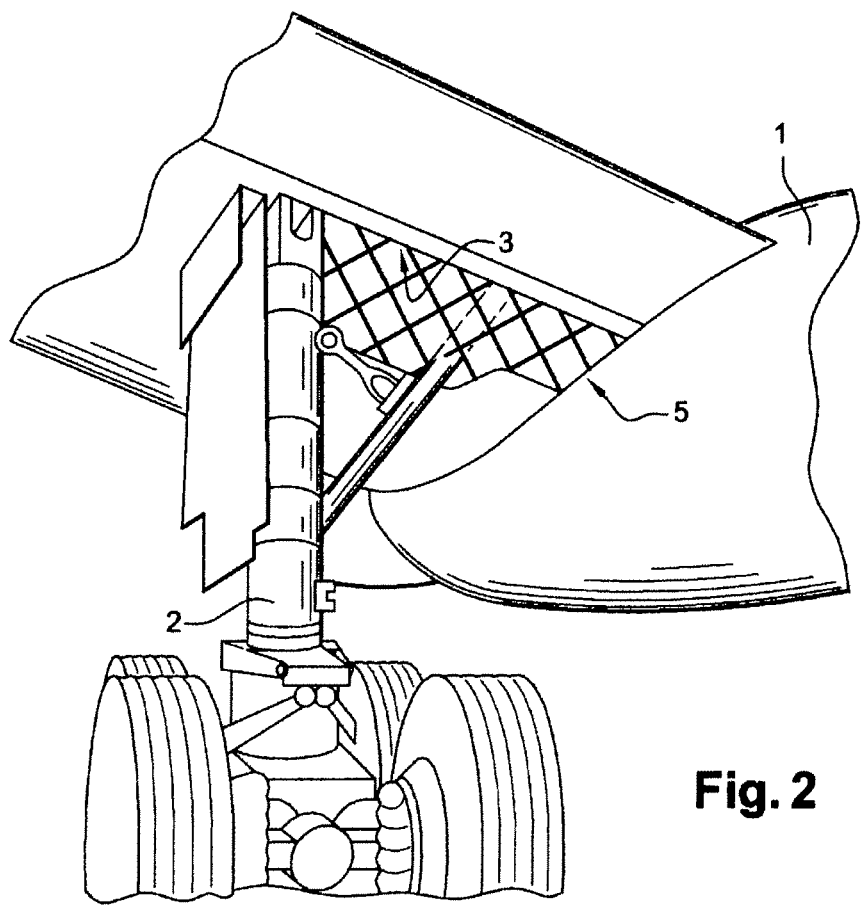
Figure 3:
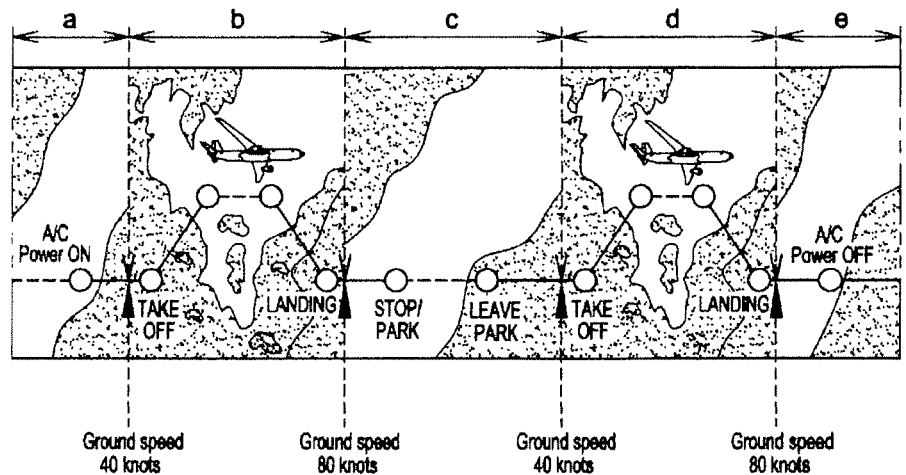
Figure 4:
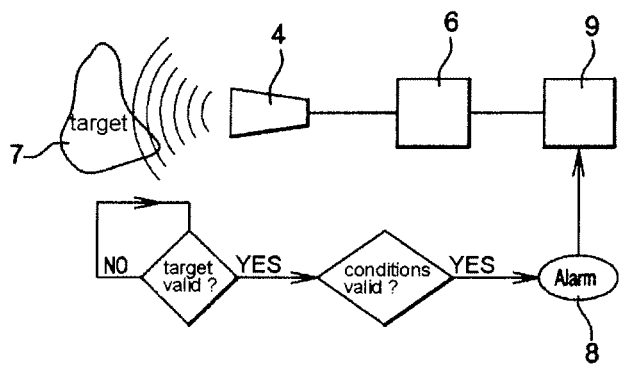
Figure 5A:
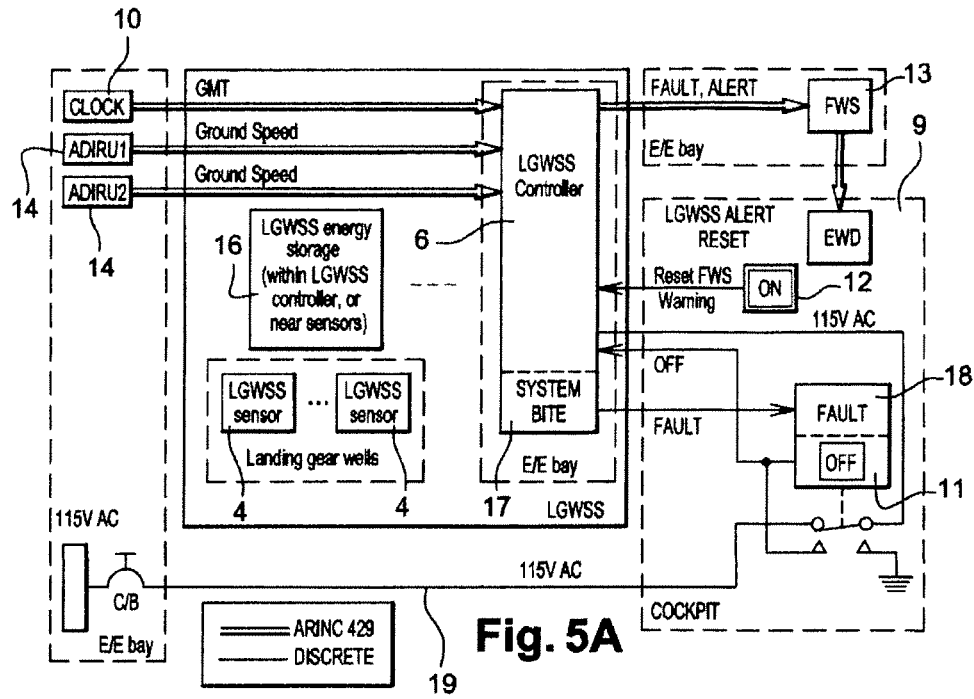
Figure 5B:
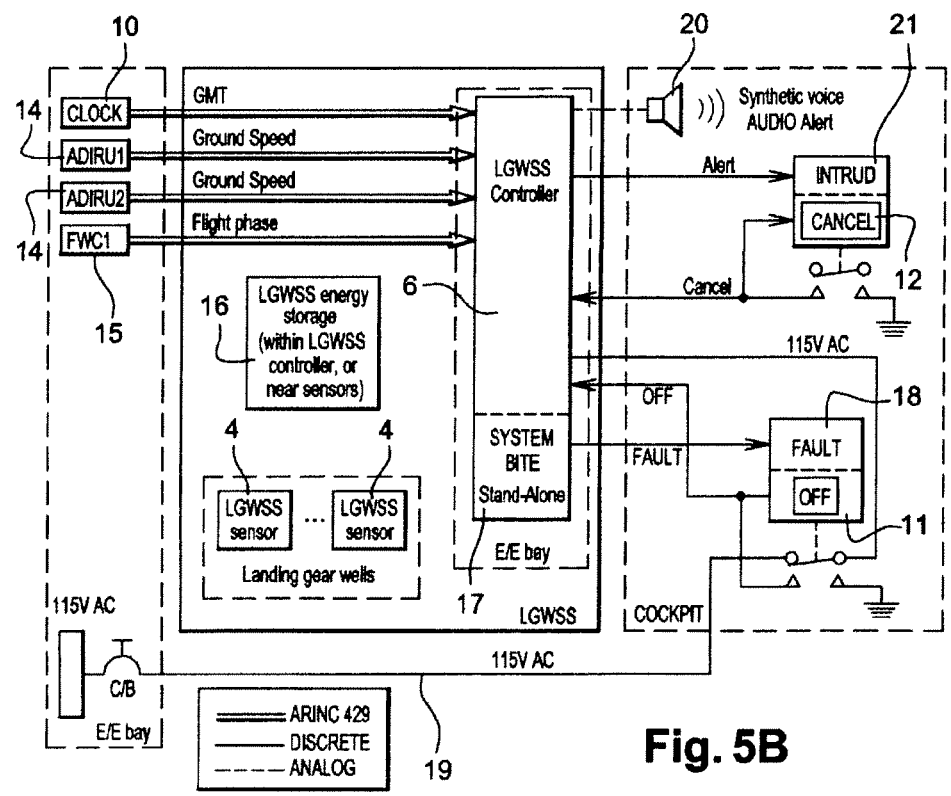

Other characteristics and advantages of the disclosed embodiments will be apparent on reading the description which follows of nonlimiting exemplary embodiments with reference to the drawings which represent:

BRIEF DESCRIPTION OF THE DRAWINGS in FIG. 1: a schematic view of an aircraft equipped with a device according to an aspect of the disclosed embodiments;

in FIG. 2: a detail of an aircraft gear hatch and of the inlet zone of the gear housing;

in FIG. 3: a schematic representation of the flight phases and of the operating phases of a device according to an aspect of the disclosed embodiments;

in FIG. 4: a simplified diagram of a device according to an aspect of the the disclosed embodiments;

in FIGS. 5A and 5B: block diagrams of examples of integrating a device according to an aspect of the disclosed embodiments into an avionics architecture.

DETAILED DESCRIPTION OF THE DISCLOSED EMBODIMENTS

According to FIGS. 1 and 2, the device for protection against intrusions into the housings 3 of landing gear 2 of an aircraft 1 according to an aspect of the disclosed embodiments comprises for at least one gear housing at least one sensor 4, for covering at least one inlet zone of the housing, linked to a computer 6 suitable for processing the data arising from the sensor 4.

The aim of the system is not to perform surveillance of a zone, here in this instance the gear housings, but rather to behave as an anti-intrusion system.

Preferably, the protection device according to FIG. 1 comprises a plurality of sensors 4 embedded inside the gear housings and provided with detection zones pointing outward from the gear housings.

FIG. 2 illustrates by cross-hatching an exemplary inlet zone 5 of a landing gear housing of an aircraft, this inlet zone constituting the zone to be placed under surveillance in a favored manner.

The device according to the aspects of the disclosed embodiments uses embedded sensors of the infra-red or radar or laser sensor type or of the intelligent video system type using motion detection or a combination of several technologies such as in particular the combination of radar and infrared sensor so as to provide, as represented in FIG. 4, data suitable for detecting the intrusion of a target 7 and for generating an intrusion presence or absence indication suitable for triggering an alarm 8.

In the case where the sensors are of infra-red type, they can be disposed so that the interior of the gear housing is under surveillance.

In the case where the sensors are of radar sensor type, the sensors disposed inside the housing have their coverage zone directed toward the opening of the housing and can readily see their detection range limited to the interior zone of the gear housing especially in the case where these sensors are provided with detection electronics which will cancel the echoes corresponding to persons or objects in motion some distance from the inlet of the gear housing.

This radar technology is particularly suitable since it makes it possible to limit the detection range to the interior zone of the gear housing and thus to avoid untimely alarms.

The principle of the aspects of the disclosed embodiments is that the sensor or sensors 4 send the computer 6 data representative of the presence or otherwise of an element in motion at the level of the inlet of the gear housing, that the computer processes these data to validate that the detected target corresponds to an intrusion and that, based on the validity of environment conditions such as the ground speed or the flight phases of the craft, the computer does or does not trigger the alarm 8 depending on whether it determines that the environment conditions are such that the detection must be considered to be valid or invalid.

Within the framework of the aspects of the disclosed embodiments the sensor 4 can be a simple sensor, which continuously dispatches analog type data, such as a thermal measurement in the case of an infra-red sensor, a video frame in the case of a video sensor, the computer internally comprising the processing means suitable for detecting and differentiating an intrusion from a normal measurement.

The sensor 4 can also be a sensor provided with detection and shaping electronics so that the sensor then dispatches data representative of an intrusion to the computer when a valid target has been detected.

In the latter case, the sensors can dispatch data of computer frame type and be linked in parallel with a communication bus of computer bus type thereby simplifying the wiring of the device and even making it possible to link the sensors 4 and the computer 6 through a pre-existing communication bus of the aircraft.

The protection device according to one embodiment is such that the computer 6 is linked to a device 9 for providing indications of flight phases of the aircraft.

FIGS. 5A and 5B which are described hereinafter corresponding to two embodiments depending on whether the computer 6 is linked to a device that is centralized or otherwise.

FIG. 5A corresponds to an exemplary embodiment for which the device for providing indications comprises a centralized alarm device 13 for managing the alarms generated onboard the aircraft, performing management of the priorities of alarms and suitable for masking certain types of alarms during critical phases such as the takeoff and the landing of the aircraft and to which the computer 6 is linked.

FIG. 5B corresponds to an embodiment for which the device comprises its own viewing means, the device for providing indications 9 being a panel of the cockpit grouping together indications of alarms.

With reference to FIG. 5A, the device of this embodiment is linked at input to several items of equipment.

It is on the one hand linked to computers 14 (ADIRU: Air Data Inertial Reference Unit) which are embedded computers which provide a large amount of reference data to the avionics, including in particular the ground speed of the aircraft.

The ADIRUs 1 and 2 dispatch the ground speed to the computer 6. This ground speed makes it possible to change the detection status of the device to inactive mode or to active mode. ADIRU1 is used in the guise of primary source, ADIRU2 is used in degraded mode in the event that ADIRU1 is lost.

The computer 6 of one embodiment comprises its own internal dock and is furthermore linked to an aircraft clock generator CLOCK 10 providing GMT time making it possible to synchronize the internal clock of the device.

The computer 6 comprises a unit 17 (BITE: Built In Test Equipment), automatic test system, meeting avionics standards and integrated into the avionics computers, suitable for transmitting an error message (FAULT) in the event of failure of said computer so as to turn on an error telltale light 18 at cockpit level.

This unit carries out steps of auto-testing of the device and allows viewing in the event that defects are detected.

The computer 6 is linked at output to a centralized item of equipment for managing aircraft alarms (FWS: Flight Warning System), part of a centralized system for managing aircraft alarms (ECAM: Electronic Centralized Aircraft Monitoring) comprising an alarms monitor screen 9 (EWD: ECAM Warning Display).

The device of this embodiment must inform the pilots or maintenance in particular in the event of intrusion at night.

According to the example of FIG. 5A, these indications are relayed by the centralized system 13 named FWS.

This system manages all the alarms generated onboard and also performs management of the priorities so that there is no superposition of alarm. For example, an oil level alarm will never be superimposed with an engine fire alarm which is much more critical.

In addition to this management of the criticality level, the FWS masks certain types of alarm during critical phases such as takeoff and landing.

All airliners are equipped with this centralized alarm system. However, the standards of the FWS vary depending on the types of aircraft. For example, in order for a new system to connect directly to the FWS, it is necessary for the FWS to be equipped with the appropriate standard so as to recognize this new system.

In the case of FIG. 5A, the FWS is equipped with the proper standard and in this case the device can be connected thereto.

The computer 6 of the device of the disclosed embodiments dispatches to the FWS the following indications:
  the alert or alerts;
  the location of the alert (central gear, left lateral gear, front gear, etc.)
  its fault messages.

In the event that a fault is detected, the computer 6 also illuminates the FAULT telltale light 18 in the cockpit.

Still according to FIG. 5A, the device furthermore comprises a bi-stable on/off button 11 located in the cockpit and linked to the computer 6.

This button makes it possible to shut the system down completely in the event of a major fault or quite simply if the operator does not wish to use the system (in the event of maintenance for example).

Finally, the device furthermore comprises a stable mono button 12 located in the cockpit and linked to the computer 6 in order to shut down and reset the alarm to zero.

The device is preferably equipped with its own inherent rechargeable energy source 16 so as to be able to operate in a completely independent manner. This can be a battery, a super-capacitor or the like. This inherent energy source is recharged by the electrical generation 19 of the aircraft (115 VAC for example).

In the case of FIG. 5B, the FWS does not have the proper standard and the alarm generation on the basis of the device of the disclosed embodiments is done by a non-centralized means.

Therefore, the device of the disclosed embodiments is preferably envisaged with two architectures, the first integrated with connection to the FWS, the second in autonomous mode with a specific alarm generation without involving the FWS.

In order to alleviate the absence of connection to the FWS which manages a certain number of priorities as explained above, it is necessary to add a specific connection which makes it possible to be certain that the system is shut down during the takeoff phases (even in the event of ADIRU faults) and that there is no alarm superposition during critical phase.

For this purpose, an additional connection is added at input with one of the computers for managing the alert messages and flight parameters 15 of the avionics system dubbed FWC (Flight Warning Computer) which gives, in particular, the aircraft flight phases.

Such a connection does not require any specific standard since in that case, an indication is sought, in this instance here the flight phases.

The FWC1 emits data representative of the flight phases and these data are received and processed by the computer of the device of the disclosed embodiments so as to change the detection status of the device from inactive to active as a function of the flight phases.

The device is furthermore connected to ADIRU1 and ADIRU2 used in FWC1 save mode (in the event of a fault of the FWC1 in flight for example).

Just as for the device of FIG. 5A, the device of FIG. 5B comprises a bi-stable switch-OFF button located in the cockpit which makes it possible to shut the system down completely.

It also comprises a stable mono button located in the cockpit making it possible to shut down and to reset the alarm to zero and also to turn off the telltale light in the cockpit and the audio alarm 20.

In the case of FIG. 5B the device comprises a specific telltale light (INTRUD Light) 21 which comes on in the event of intrusion detection and generates by way of a specific loudspeaker located in the cockpit (synthetic voice for example) an audible alarm 20 in the event of intrusion.

It finally comprises the FAULT telltale light 18 in the cockpit which comes on in the event of a fault.

Hence, the device comprises, in either case, means suitable for changing its detection status, from an active mode to an inactive mode, as a function of the indications of flight phases through the data provided by the computers ADIRU or FWC.

In particular, in the case of the autonomous operation of FIG. 5B, the computer 6 itself comprises the means for considering the flight phase indication, suitable for activating detection when the aircraft is on the ground, for deactivating detection during the takeoff phase onward of a first given ground speed and for reactivating detection during the landing at a second ground speed whereas within the framework of FIG. 5A the means for considering the indication are optionally located in the FWS with speed setpoints particular to the device of the disclosed embodiments.

FIG. 3 represents an example of states of the device according to the aircraft's flight phases.

In phase "a" after power-up of the system (AC power ON) the device is active until the aircraft is rolling at a speed of for example 20 to 50 knots and preferably of the order of 40 knots.

Onward of this speed, the system passes to the inactive state throughout the flight phase "b" until the aircraft lands and reduces its speed to a speed of the order of 90 to 60 knots and for example around 80 knots.

In phase "c" the system is re-enabled throughout the rolling phase after the speed passes below 80 knots, during the phase of stopping in the parking bay for refueling, disembarkation and embarkation of passengers and until the next takeoff and a speed attained of 40 knots.

In phase "d", flight phase, the system is again deactivated and on returning to the ground, phase "e", at a speed below 80 knots until the electrical power supply is shut off (AC power OFF) the system is re-enabled.

As described previously, the sensors 4 and the computer 6 are advantageously linked through an avionics bus of the aircraft and in particular through a bus meeting the ARINC 429 standard, the aircraft comprising a plurality of sensors 4 and at least one computer 6 linked through the avionics bus.

The method of detecting intrusion into at least one housing 3 of landing gear 2 of an aircraft 1 with the device described above thus comprises surveillance of the inlet zone of the housing with a device comprising at least one sensor linked to a detection and validation computer, processing of the data arising from the sensor at the level of the computer so as to isolate a signature representative of an intrusion into said housing, determination of surveillance slots and of inactivation slots as a function of data arising from at least one avionics computer emitting data representative of flight phases or of ground speed of the aircraft, alarm triggering when an intrusion detection is detected and the data representative of flight phases or of ground speed are determined as being compatible with the surveillance slot.

In the case seen previously for which the device is autonomous, the determination of the surveillance activation and surveillance inactivation slots is carried out at the level of the detection and validation computer.

In the case where the computer of the device is hooked up to a computer for grouping alarms of LWS type managing the alarms and the priorities, the detection and validation computer transmits intrusion detection data to the computer for grouping alarms and the determination of the surveillance activation and surveillance inactivation slots is performed and the alarm/alarms generated by the computer of the device is/are validated or is/are invalidated at the level of the alarm grouping computer.

The device according to one embodiment will be dubbed LGWSS in technical aeronautical language, standing for Landing Gear Well Surveillance System, as it is known in English.

The aspects of the disclosed embodiments are not limited to the examples represented and in particular, the device suitable for landing gear housings which remain open throughout the phases during which the aircraft is on the ground can be supplemented with sensors for detecting intrusions into other housings of the aircraft while remaining within the framework of the aspects of the disclosed embodiments.

What is claimed is:

1. A device for protection against intrusions into housings of landing gear of an aircraft comprising:
   at least one sensor, for detecting intrusion into at least one inlet zone of, at least one of the housings; and
   a computer linked to a device for providing indications of at least one of flight phases and ground speed of the aircraft, the computer configured for processing data arising from the sensor so as to detect an intrusion of a target and for generating an intrusion presence indication as a function of said indications of at least one of flight phases and ground speed.

2. The protection device as claimed in claim 1 for which the computer comprises means, for considering the indication of at least one of flight phase and ground speed, for activating detection when the aircraft is on the ground, for deactivating detection during a takeoff phase exceeding a first ground speed and for reactivating detection during landing at a second ground speed.

3. The protection device as claimed in claim 1 further comprising a bi-stable on/off button located in the cockpit and linked to the computer.

4. The protection device as claimed in claim 1 further comprising that the computer is linked to a centralized alarm device, for managing the alarms generated onboard the aircraft, performing management of the priorities of alarms and suitable for masking certain types of alarms during critical phases such as the takeoff and the landing of the aircraft.

5. The protection device as claimed in claim 1 wherein the at least one sensor comprises a plurality of sensors embedded inside the housings and provided with detection zones pointing outward from the housings.

6. The protection device as claimed in claim 1 wherein the at least one sensor is of the radar type with detection range limited to the inlet zone of the gear housing.

7. An aircraft equipped with a protection device as claimed in claim 1.

8. A method for detecting intrusion into at least one housing of landing gear of an aircraft comprising:
   monitoring an inlet zone of the housing with a device comprising at least one sensor linked to a detection and validation computer;
   processing data arising from the sensor at the computer to isolate a signature representative of an intrusion into said housing,
   determining an intrusion detection activation and an intrusion detection inactivation as a function of data representative of flight phases or of ground speed of the aircraft from at least one avionics computer, and
   triggering an alarm when an intrusion has been detected and the data representative of flight phases or of ground speed are determined as being compatible with intrusion detection activation.

9. The method of claim 8, further comprising determining the intrusion detection activation and inactivation by the detection and validation computer.

10. The method of claim 8, wherein the detection and validation computer transmits intrusion detection data to a computer for grouping alarms and for which the alarm grouping computer determines the intrusion detection activation and inactivation and respectively validates or invalidates the alarm.

* * * * *